(12) United States Patent
Lynch

(10) Patent No.: US 6,698,381 B2
(45) Date of Patent: Mar. 2, 2004

(54) PET ACCESSORIES

(76) Inventor: Kris Lynch, 44 Concourse East, Brightwaters, NY (US) 11718

( * ) Notice: Subject to any disclaimer, the term of this patent is extended or adjusted under 35 U.S.C. 154(b) by 0 days.

(21) Appl. No.: 10/178,402

(22) Filed: Jun. 24, 2002

(65) Prior Publication Data

US 2003/0000478 A1 Jan. 2, 2003

Related U.S. Application Data

(60) Provisional application No. 60/300,920, filed on Jun. 28, 2001.

(51) Int. Cl.[7] .............................. A01K 7/00; A01K 5/00
(52) U.S. Cl. ..................... 119/61; 119/51.02; 119/72
(58) Field of Search ................ 119/51.02, 72, 119/69.5, 61; 73/1.31; 324/149

(56) References Cited

U.S. PATENT DOCUMENTS

| | | | | |
|---|---|---|---|---|
| 3,163,843 A | * | 12/1964 | Dieckamp | 73/290 V |
| 3,962,630 A | * | 6/1976 | Chaffee | 324/149 |
| 4,259,635 A | * | 3/1981 | Triplett | 324/149 |
| 4,426,956 A | * | 1/1984 | McKinstry | 119/72 |
| 5,778,820 A | * | 7/1998 | van der Lely et al. | 119/51.02 |
| 5,784,998 A | * | 7/1998 | Manzer | 119/69.5 |
| 6,371,047 B1 | * | 4/2002 | van den Berg | 119/51.02 |
| 6,427,627 B1 | * | 8/2002 | Huisma | 119/51.02 |
| 6,484,666 B1 | * | 11/2002 | Reusche | 119/69.5 |

* cited by examiner

*Primary Examiner*—Charles T. Jordan
*Assistant Examiner*—Elizabeth Shaw
(74) *Attorney, Agent, or Firm*—Keusey, Tutunjian & Bitetto, P.C.

(57) ABSTRACT

A device for indicating the presence of an electrical path on a pet accessory includes a first contact disposed on a probe, and a second contact disposed in a spaced apart arrangement relative to the first contact. An activation device is responsive to the presence of an electrical path or lack thereof between the first and second contacts. The activation device provides an indication of the state of the electrical path between the first and second contacts. The device preferably includes a pet dish and the probe extends into the dish to indicate a desired level for liquid in the dish, and the indication of state is performed by at least one of an audio message, a visual effect and a mechanical motion.

20 Claims, 19 Drawing Sheets

Script

Phrases
1. Ruff
2. Come onnn
3. Let's go out
4. I won't just sniff trees
5. Oooh
6. Gotta go
7. We don't like accidents
8. I really
9. This is an emergency
10. Hurry
11. Did anyone hear me

Phrases
1. Ruff
2. Hey
3. Did you foget about me
4. I'm thirsty
5. Come onnn
6. No water again
7. Oooh I remember where there's some
8. My bowl is empty
9. Oooops

*Meow - 1A on wav file will substitute 1 "Ruff" for programming on cat chip. All other saying programing remains the same.

Ⓐ = 1
Ⓒ = 2 + 3 + 4
Ⓓ = 5 + 4
Ⓔ = 2 + 6 + 7
or  9 + 6 + 7
Ⓕ = 9 + 6
Ⓖ = 2 + 8

Ⓘ = (1) 2 + 3 + 4 + 5 + 4 (1 + 1)
Ⓙ = (1) 5 + 4 + 2 + 8 + (1 + 1)
Ⓚ = (1 + 1) 2 + 8 + 6 + 7 + (1 + 1)
Ⓛ = (1 + 1) 2

1. No water = Activation sequence 1
2. 5 minutes later still no water = sequence 2
3. 10 minutes later still no water = sequence 1
4. 20 minutes later still no water = sequence 2
5. 30 minutes later still no water = sequence 1
6. 30 minutes later still no water = sequence 2
   Continues at 30 minute activations
   alternating between 1 & 2 until water is added.

US 6,698,381 B2

PET ACCESSORIES

RELATED APPLICATION DATA

The present disclosure claims priority to U.S. provisional application Ser. No. 60/300,920 filed on Jun. 28, 2001, which is hereby incorporated by reference.

A portion of the disclosure of this patent document contains material, which is subject to copyright protection. The copyright owner has no objection to the facsimile reproduction by anyone of this patent document or the patent disclosure, as it appears in the U.S. Patent and Trademark Office patent file or records, but otherwise reserves all copyrights whatsoever.

BACKGROUND

1. Technical Field

This disclosure relates to pet accessories, and more particularly, to pet communication devices, leashes and pet toys.

2. Description of the Related Art

While pets may be trained to obey commands given by humans, it is difficult at times for pets to clearly communicate with humans to express their needs. While some pets are trained to ring a bell or scratch a door when it is time to go out, a need exists for better ways to clearly indicate a pets needs to humans.

Pets do not have an understanding of safety issues. For example, being on a dark road or crossing a busy street is very dangerous for pets since the same danger perceived by humans is not understood by the pet. Therefore, alerting humans of the pet's presence alone or with their owner on, for example, a roadway is advantageous. In this way, humans will be made aware of dangerous conditions for pets and take appropriate action.

Pets do not understand their nutritional needs. Vitamins and dietary supplements are often administered to pets by hiding these supplements in their food. The pets often detect these supplements and avoid eating the food. Therefore, a need exists for alternate ways of supplying nutritional supplements. These and other pet needs will be described in greater detail below along with pet accessories, which address these needs.

SUMMARY OF THE INVENTION

The present invention provides pet accessories, which communicate to humans, the needs of their pets. In one embodiment, a combination wind blocker and an indicator that the pet must go out is provided. In another embodiment, a device for determining the level of liquid in a pet dish is provided, which alerts people in the vicinity that the liquid levels are low. In still other embodiments, pet or human leashes are provided with a plurality of accessories. For example, a combination leash and radio is provided. Other leashes include powered lights and/or reflectors. The powered lights may include optical fibers woven into the leash. The reflectors may include heat stamped designs stamped onto the material of the leash. Other devices disclosed herein include teether designs, which include edible or ingestible portions. The present invention will now be described in greater detail with reference to illustrative examples.

A device for indicating the presence of an electrical path on a pet accessory includes a first contact disposed on a probe, and a second contact disposed in a spaced apart arrangement relative to the first contact. An activation device is responsive to the presence of an electrical path or lack thereof between the first and second contacts. The activation device provides an indication of the state of the electrical path between the first and second contacts. The device preferably includes a pet dish and the probe extends into the dish to indicate a desired level for liquid in the dish, and the indication of state is performed by at least one of an audio message, a visual effect and a mechanical motion.

A liquid level indicator for a vessel, includes a probe extending to a first depth in the vessel. A first contact is disposed on the probe, wherein one at least one contact is located at the first depth such that when the vessel is filled with a liquid, an electrical connection is made between the first contact and a second contact until a level of the liquid falls below the first depth. An activation device is includes and provides an action when the level of liquid has fallen below the first depth. The vessel preferably includes a pet dish and a housing may include a shape of an animal.

A pet warning device, includes an elongated base unit configured and dimensioned to fit at a base of a doorway so as to prevent a draft. A deformable enclosure is removably attached to the base, and a switching device is disposed within the enclosure housing which permits a pet to depress the enclosure to trigger a warning indicator.

A restraining device, such as a belt or strap, includes a base material, an illuminating feature disposed in or on the base material, and an adjustment mechanism to adjust a fit of the fabric to conform to a wearer.

A chew toy includes a polymer matrix formed into a shape, one or more holes or divots formed in the matrix and at least one of a nutritional supplement, medication, and flavoring provided in the holes or divots.

These and other objects, features and advantages of the present invention will become apparent from the following detailed description of illustrative embodiments thereof, which is to be read in connection with the accompanying drawings.

BRIEF DESCRIPTION OF DRAWINGS

This disclosure will present in detail the following description of preferred embodiments with reference to the following figures wherein.

DETAILED DESCRIPTION OF PREFERRED EMBODIMENTS

The present invention provides pet accessories, which communicate to humans, the needs of their pets. In one embodiment, a combination wind blocker/indicator that the pet must go out is provided. In another embodiment, a device for determining the level of liquid in a pet dish is provided, which alerts people in the vicinity that the liquid levels are low. In still other embodiments, pet or human leashes, collars, cuffs or straps are provided with a plurality of accessories. For example, a combination leash and radio is provided. Other leashes include powered lights and/or reflectors. The powered lights may include optical fibers woven into the leash. The reflectors may include heat stamped designs stamped onto the material of the leash. Other devices disclosed herein include teether designs, which may include edible portions. These edible portions may include nutritional supplements or medications for the pet.

The present invention will now be described in greater detail with reference to illustrative examples. It is to be understood that the present invention is not limited to the illustrative examples and may be employed with other configurations within the scope and spirit of the present invention.

Figure 1:
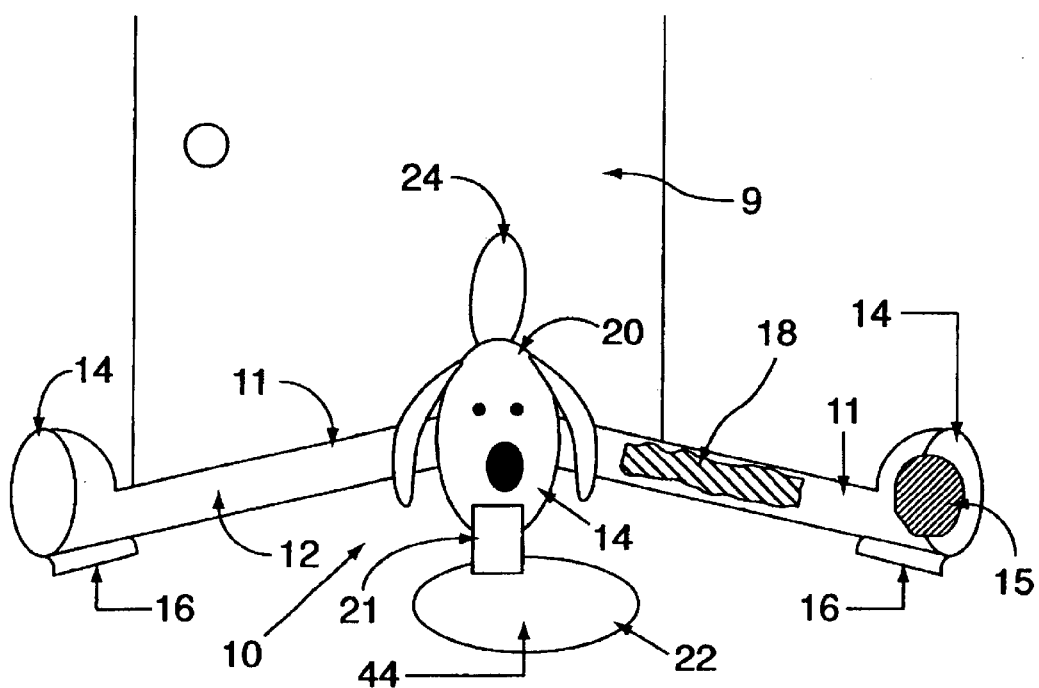
FIG. 1 is a perspective view of a combination pet indicator and wind blocker showing partially removed sections to show inner materials in accordance with the present invention.

Referring now in specific detail to the drawings in which like reference numerals identify similar or identical elements throughout the several views, and initially to FIG. 1, a pet reminder device 10 is shown in accordance with one embodiment of the present invention. Device 10 preferably includes a soft flexible outer surface 12. Device 10 includes at least one elongated portion 11. Elongated portion 11 may include a height of a few inches and a length of about 3 feet to be suitable as, for example, a wind/draft blocker at the base of a door 9. Other dimensions are also contemplated.

Device 10 includes weighted portions 14, which may include a non-skid material 16, such as rubber, to prevent device 10 from being easily dragged. Alternately, device 10 may have its weight distributed throughout, and material 16 may be continuous on elongated portion 11. Weighted portions 14 may include materials 15, such as polyethylene, or any other material, which provides weight to device 10 without endangering a pet's health if ingested.

Elongated portion 11 preferably is filled with insulation material 18 (e.g., polyester, etc.). Insulation material 18 prevents heat transfer from a dwelling or building from escaping/entering under a doorway when device 10 is employed as a wind/draft blocker. Device 10 may include an ornamental portion 20. Ornamental portion 20 may include a dog's head, a cat's head, likenesses of famous characters, other animal or human forms, etc. Device 10 preferably includes a washable surface and may include different textures, such as a smooth texture (e.g., vinyl), a furry texture, etc. Other portions of device 10 can be ornamented as well.

In one embodiment, portion 20 provides an attachment 21 to a pad 22. Attachment 21 between portion 20 and pad 22 may include arrangements, such as a hook and loop arrangement (e.g., VELCRO®), magnetic connections, mechanical connection (e.g., a zipper), etc. Pad 22 includes circuitry and mechanical switches, which can be activated by a pet to indicate that it is time for the pet to go out or indicate other pet needs or emotions. In an alternate embodiment, pad 22 is permanently fixed to portion 20. However, having pad 22 detachable permits surface washing and/or easier maintenance of pad 22. In addition, the use of pad 22 may be desired without elongated portions 11 and portion 20. Portion 20 or elongated portions 11 may include a loop 24 so that device 10 can be conveniently hung on a doorknob while the pet is being walked, etc. Activation of pad 22 is completed by pressing one or more switches included therein.

Device 10 may also be employed as a wind blocker alone, with or without pad 22. Pad 22 may include lettering 44 thereon. Lettering 44 may include a pet's name, a saying or any other expression.

Figure 2:
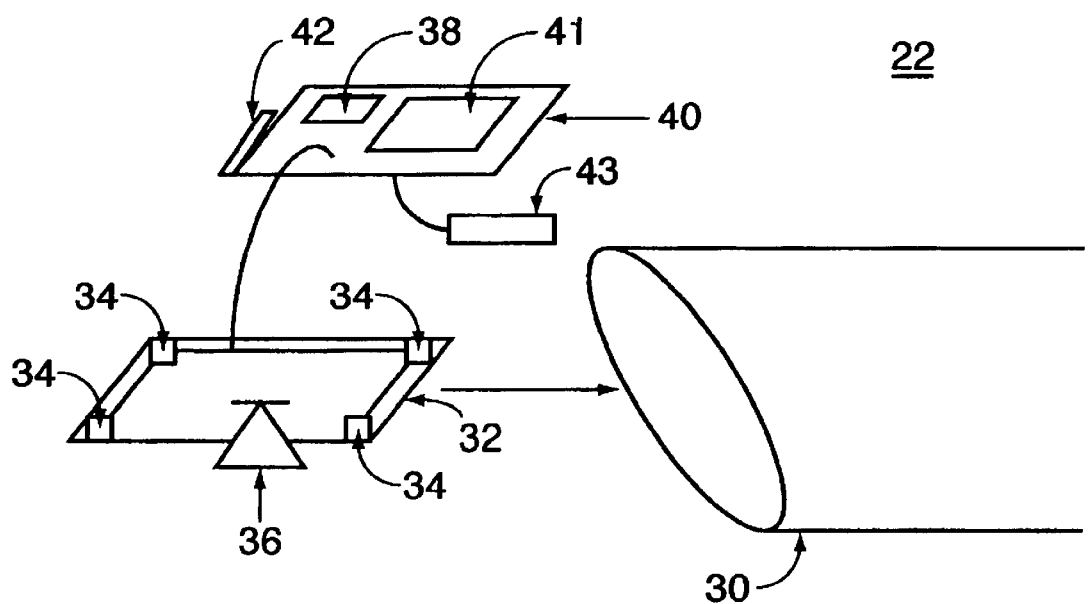
FIG. 2 is an exploded perspective view of a pad portion of the combination device of FIG. 1 in accordance with the present invention.

Referring to FIG. 2, an exploded view of pad 22 is shown in accordance with the present invention. Pad 22 preferably includes an outer surface or case 30. Case 30 preferably includes a machine washable fabric or a durable surface washable material. Pad 22 includes a board 32, which includes a plurality of switches 34 (switches 34 are attached on the underside of board 32). Board 32 is rotatably connected to a fulcrum 36 such that a simple teeter-totter effect is provided so that when a pet steps on pad 22 a mechanical advantage is gained to activate one or more switches 34. In other words, no matter where the pet steps on pad 22 the top balance piece will tilt and/or pivot (like a teeter-totter) and activate one or more of switches 34.

Switches 34 may include contact switches, which are biased in the open position. When switches 34 are closed a sound chip 38 on circuit card 40 is activated to indicate that the pet wishes to go out or to communicate other needs or emotions of the pet. A speaker 41 (e.g., a 29 mm speaker) is employed to provide loud and clear sound in accordance with sound chip 40. A power source 43 may include batteries or the ability to be plugged into a wall outlet.

Figure 3:
FIGS. 3 and 4 show an illustrative script for audio responses of the combination device of FIGS. 1 and 2.

In one embodiment, the activated sound recorded in chip is a random selection of originally recorded voice phrases from an originally programmed chip. Alternately, custom-made sound chips may be provided or the user may also program the recordings. Chip 40 may include a random combination of phrases (see, e.g., phrases 1–11 on FIG. 3). Combinations A–K as shown in FIG. 3 may be randomly selected by chip 40 when activated by closing one or more switches 34. Pad 22 includes an on/off switch 42 to turn pad on/off. Alternate embodiments include lights or mechanical motion devices, which are activated by switches 34 in accordance with the pet's triggering switches 34.

Figure 4:
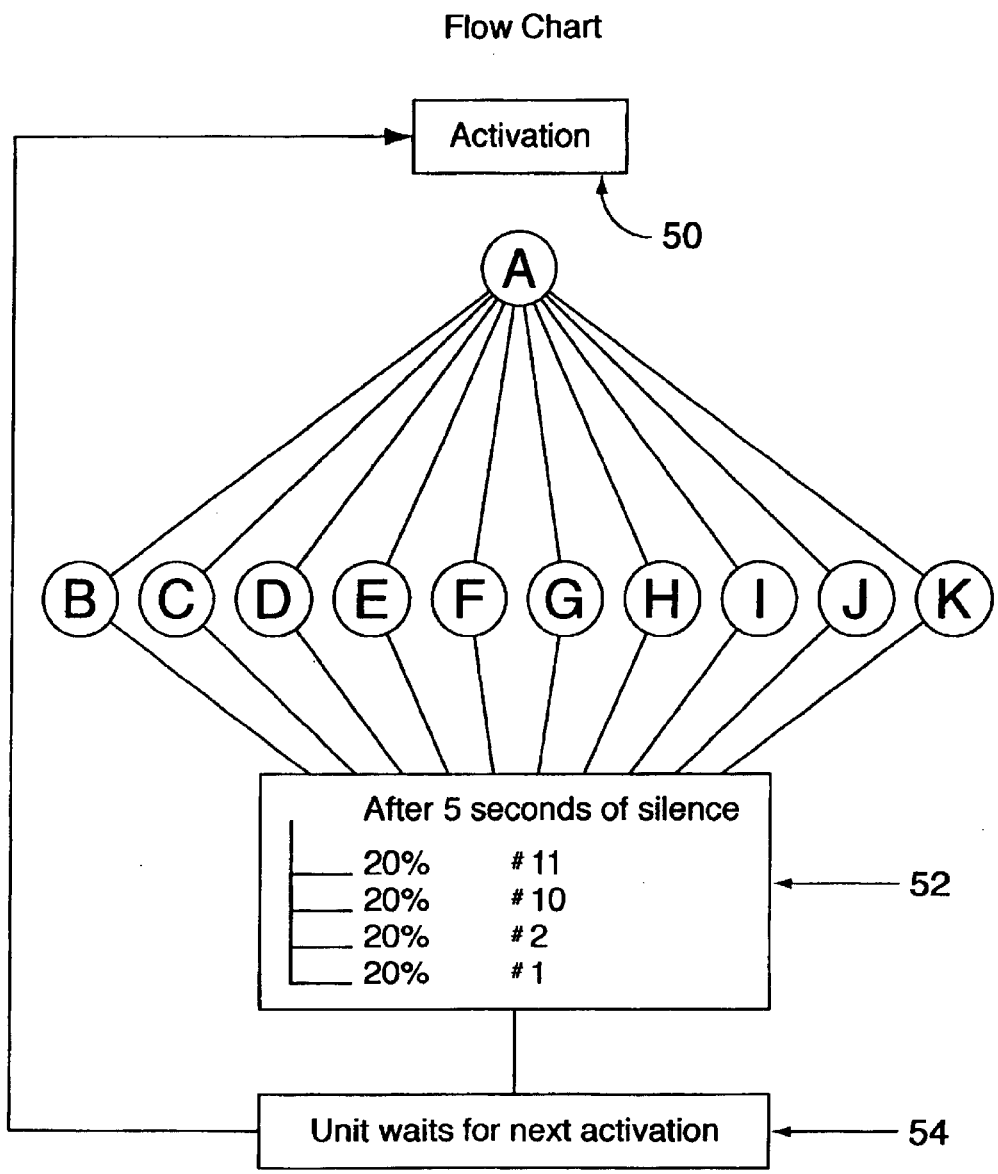

Referring to FIGS. 3 and 4, an illustrative flow chart for activation of chip 40 is shown. After activation in block 50, combination A is played by chip 40, followed by one of combinations B–K. The combinations B–K are randomly selected in chip 40. After a delay, e.g., 5 seconds, one of phrases 1–11 (FIG. 3) is played in block 52, frequency of occurrence of phrases may be predetermined (by percentage chance or otherwise) or randomly selected. In block 54, the unit waits for the next activation and returns to block 50 when activated. Many other combinations, times, phrases and sequences are contemplated and would be useful in accordance with the present invention. These or other phrases and combinations may be played randomly or in a predetermined order.

Figure 5:
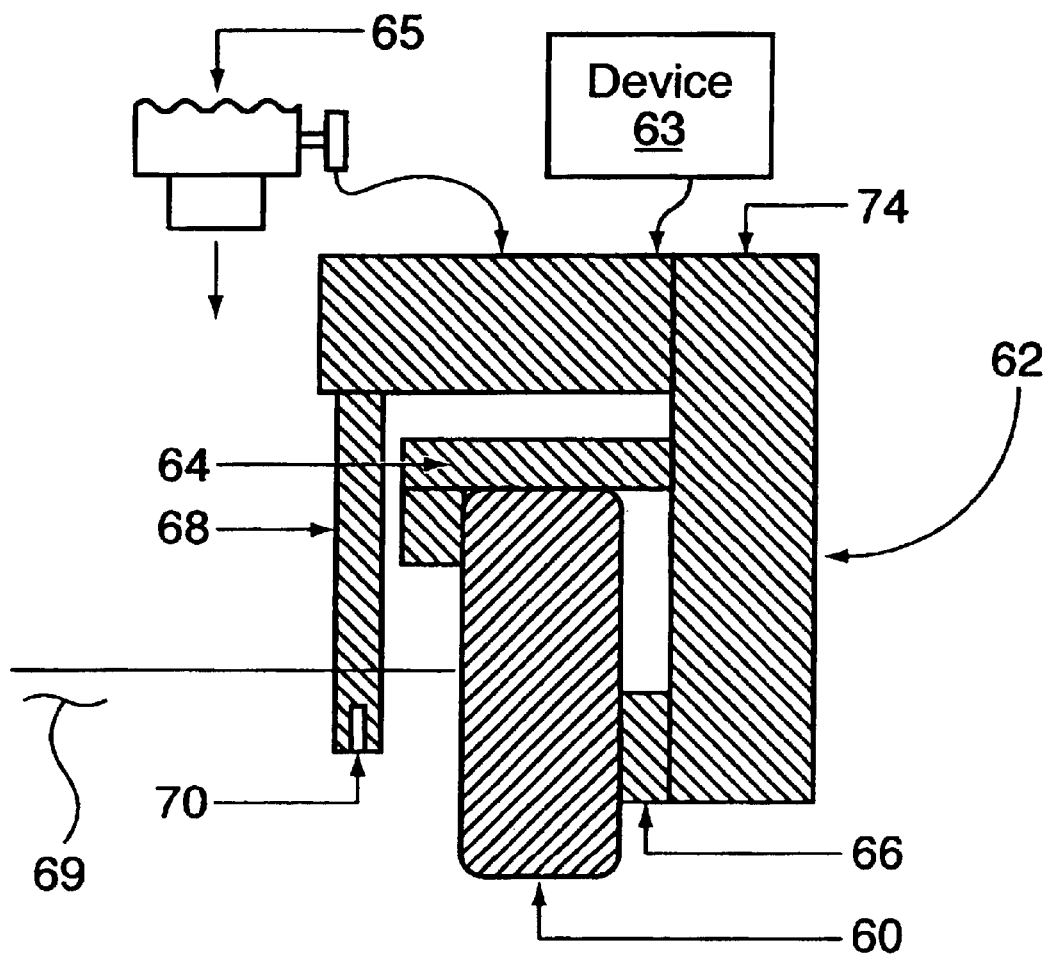
FIG. 5 is a cross-sectional view of a liquid level indicator in accordance with the present invention.

Another way of communication by a pet may include indicating when a water dish needs to be filled. Referring to FIG. 5, a cross-sectional view of a liquid level indicator device 62 is shown in accordance with one embodiment of the present invention. A pet dish wall 60 has liquid level indicator device 62 attached thereto. Device 62 may be integrally formed with dish 60 or attached to dish 60 by a plurality of different attachment mechanisms. These mechanisms may include mechanical snaps, clips, screws, rivets, magnetic pads (for steel or iron dishes), glue, etc.

In one embodiment, device 62 is detachable from dish 60. Device 62 may include clasps or hooks 64 which are adapted to clip over a rim of dish 60, and feet 66 which contact a side of dish 60 to provide attachment of device 62 to dish 60. Clasps 64 may provide a force against dish 60 to increase frictional forces and increase the stability of the attachment.

Device 62 includes a probe portion 68, which extends over the rim of dish 60 to provide further stability if in contact with dish 60. Portion 68 includes contacts 70, which sense a desired level of water or liquid 69 in dish 60. In a preferred embodiment, liquid 69 in dish 60 provides a conductive path, which closes a circuit in device 62. When liquid 69 drops below contacts 70, the circuit is opened and a sound chip or light in device 62 is activated to indicate that more liquid needs to be added to dish 60.

Device 62 includes a housing 74, preferably including a plastic or water-resistant material and is sealed by gaskets or other water excluding devices. In one embodiment, an injection molded ABS and/or PVC housing 74 is provided. Contacts 70 may be insert molded to insert stainless steel or other compatible wire through probe portion 68 allowing at least two small and inconspicuous contacts to remain exposed. Contacts 70 may be plated or coated with conductive materials to prevent corrosion. For example, contacts 70 may be gold plated.

Device 62 includes a sound module chip 80 (FIG. 6) with a recorded voice(s) which gives reminders when there is a lack of water or liquid in dish 60. Alternately, reminders may be given when the dish is full of liquid, empty or both. The programming of chip 80 (FIG. 6) permits a random selection of the sayings, expressions or sounds. In one embodiment, device 62 will activate one saying for example, then progress to a next saying in, say, 5 minutes if no water is added, then again in 10 minutes, then again in 15 minutes, then the unit will shut off. Other times and sequences are also contemplated.

Device 62 may be employed as a feedback unit for detecting a level of water in a dish. Device 62 may be attached to a water source and permit water to fill a dish by opening a valve 65 to permit water flow when a low level of water is detected. Valve 65 is closed when water is replenished. Water may be added either manually or by an automatic release.

Another device 63 may be activated upon a connection or lack of connection between contacts 70. Device 63 may be a spinner, a light, a container with a door that opens or closes based on the state of the contacts 70 (e.g., connected or not connected) or any other audio, visual or mechanical motion device. In one embodiment, a connection maybe made between contacts 70 by a pet's saliva, i.e., by licking the contacts 70. This may trigger, e.g., a container of food to open, water to be released to fill the dish, or any other mechanical motion, audio or visual effect.

Figure 6:
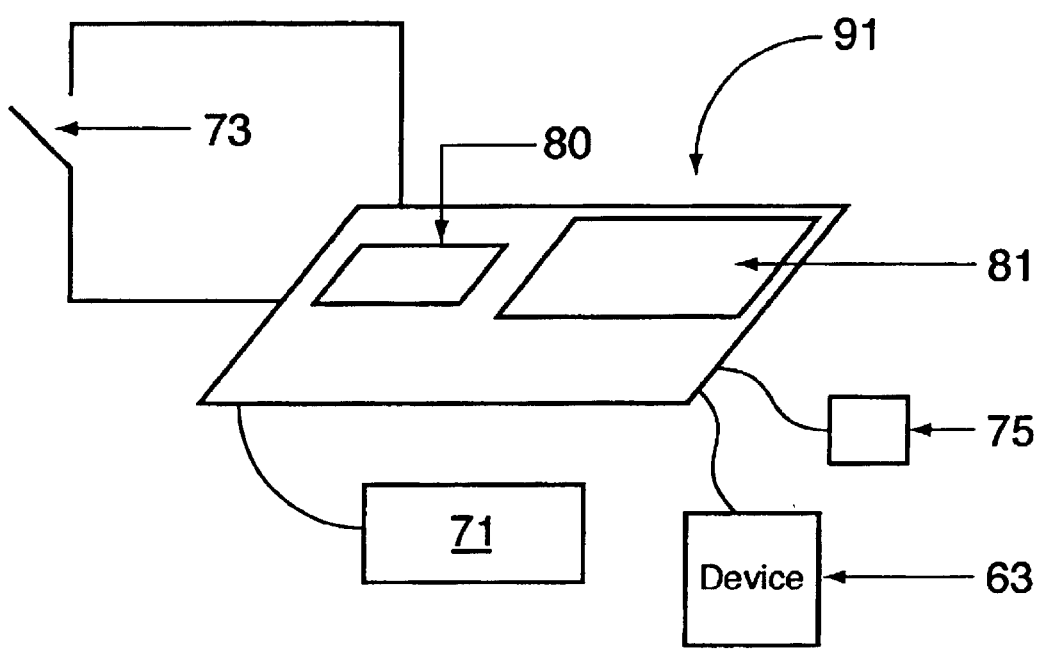
FIG. 6 is a schematic diagram showing a circuit for the liquid level indicator of FIG. 5 in accordance with the present invention.

Referring to FIG. 6, an illustrative circuit 91 is shown for implementing device 62. Contacts 70 are shown as a switch 73. When switch 73 is open, chip 80 is activated which creates and audio sequences which is played over speaker 81, e.g., a 27 mm speaker. A valve switch or solenoid 75 may be included which is activated when switch is opened to provide water and closed when switch is closed. A battery or other energy source 71 is included for powering circuit 91. An additional on/off switch can be provided to deactivate circuit 91. Other devices 63 or mechanical motions may be activated in accordance with the present invention.

Figure 7:
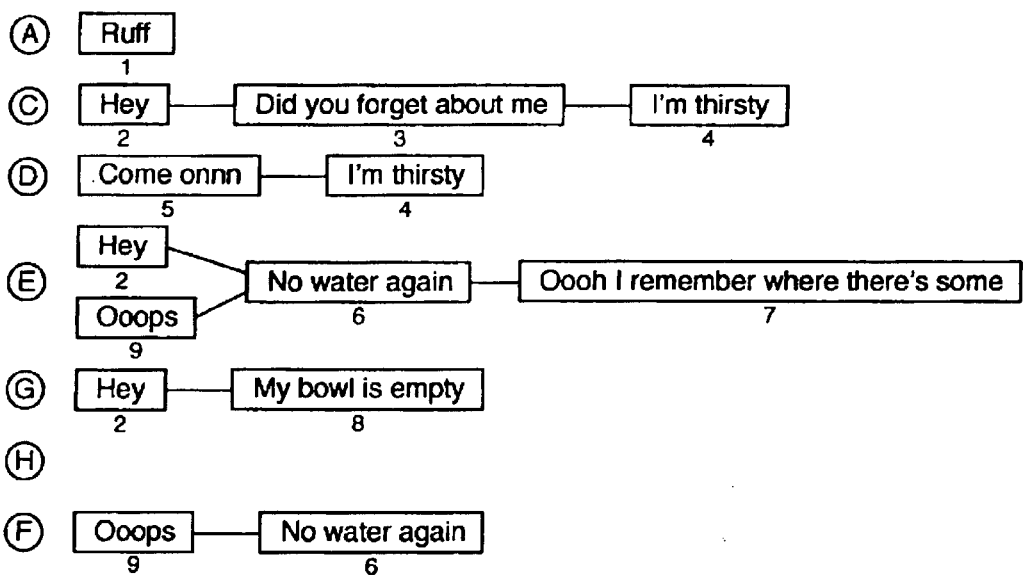
FIGS. 7 and 8 show an illustrative script for audio responses of the combination device of FIGS. 5 and 6.
Figure 8:
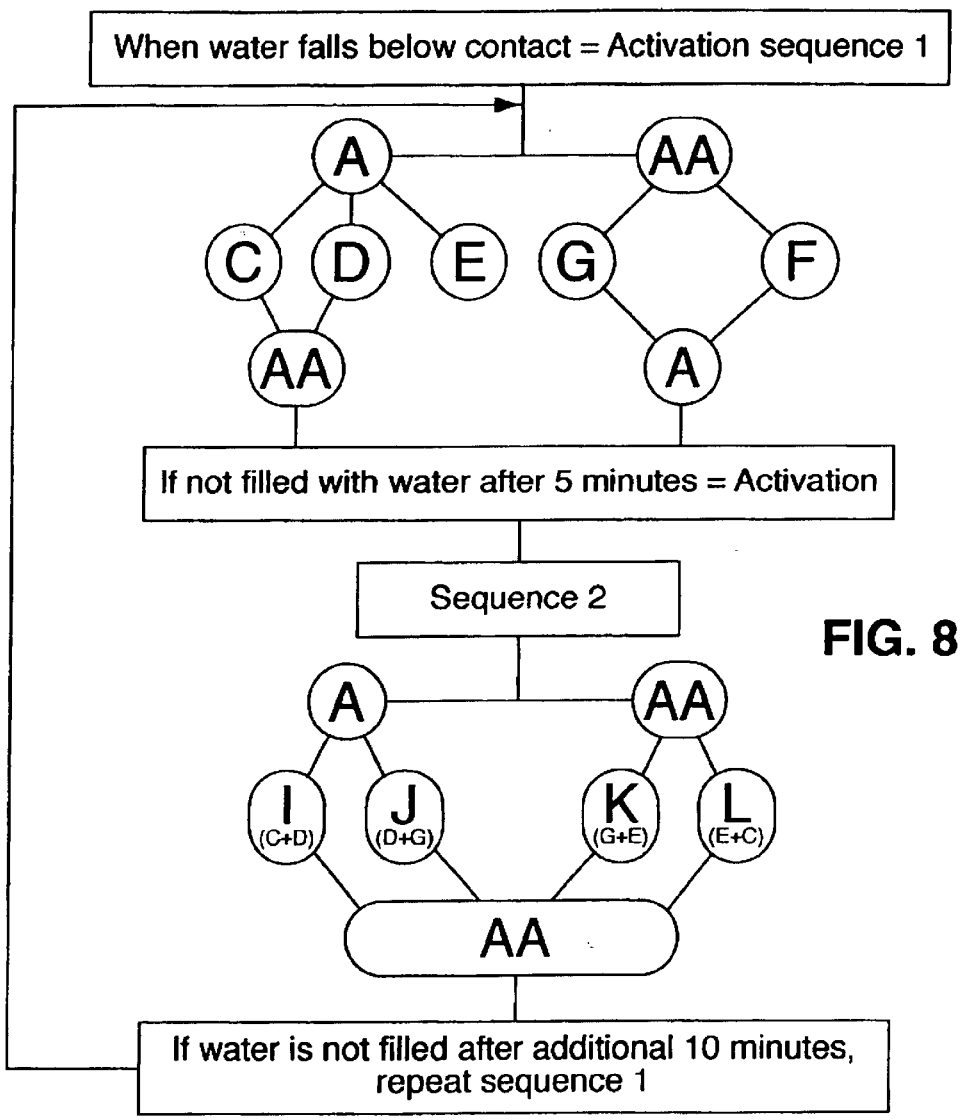

Referring to FIGS. 7 and 8, sound chip 80 can provide a plurality of different responses for device 62. FIGS. 7 and 8 show illustrative responses for one embodiment of the present invention. FIG. 7 shows phrases 1–9 (for dogs) and 1A–9 (for cats). Phrases 1–9 (and/or 1A) maybe randomly combined using chip 80 to provide combinations A–L. These audio responses are triggered in the manner described above. Other responses, such as visual responses or mechanical motions may also be employed. FIG. 8 shows an illustrative flow chart for implementing chip 80.

It is to be understood that the present invention may be employed for any pet, for example, dogs, cats, hamsters, birds, reptiles, rabbits, etc. Larger units can be added to water troths of farm animals, etc. Smaller units may remind owners to add water manually or by automatic water release into a fish tank as well. Electrical contact or lack thereof of switch 73 may be employed be trigger food release, water release or other effects, such as activation of a spinner, raising a flag, opening a container, etc.

Figure 9:
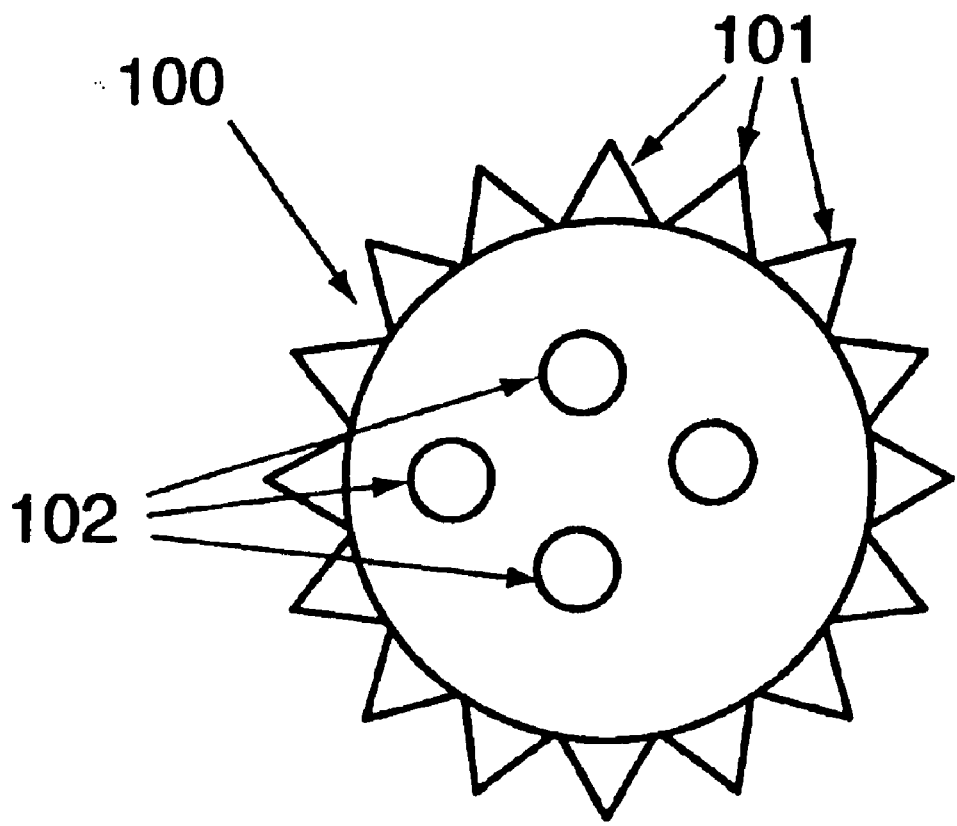
FIG. 9 depicts an illustrative teether having edible portions inserted or attached thereto in accordance with the present invention.

Referring to FIG. 9, a teether 100 is shown in accordance with the present invention. Teether 100 includes bumps 101 of insert-molded material and/or mixture of materials to create specific flavor or scents, which are pleasing to pets. For example, bumps 101 may include scented or flavored plastics, food or pet treats, which are molded into teether 100. In addition, teether 100 may include edible sections 102. Teether 100 preferably includes a soft durometer material (matrix), e.g., polyurethane, such as, injection molded virgin polyurethane, for massaging of the gums of newly cutting teeth of dogs, for example. With continual play the material and texture thereof can help keep teeth clean and eliminate tartar buildup in dogs. Bumps or divots 101 and sections 102 may be insert molded into teether 100 or attached after molding. Bumps 101 may include nutritional supplements or medication. Bumps 101 may be manually added to teether/chew toy 100 or molded directly into toy 100.

Figure 10:
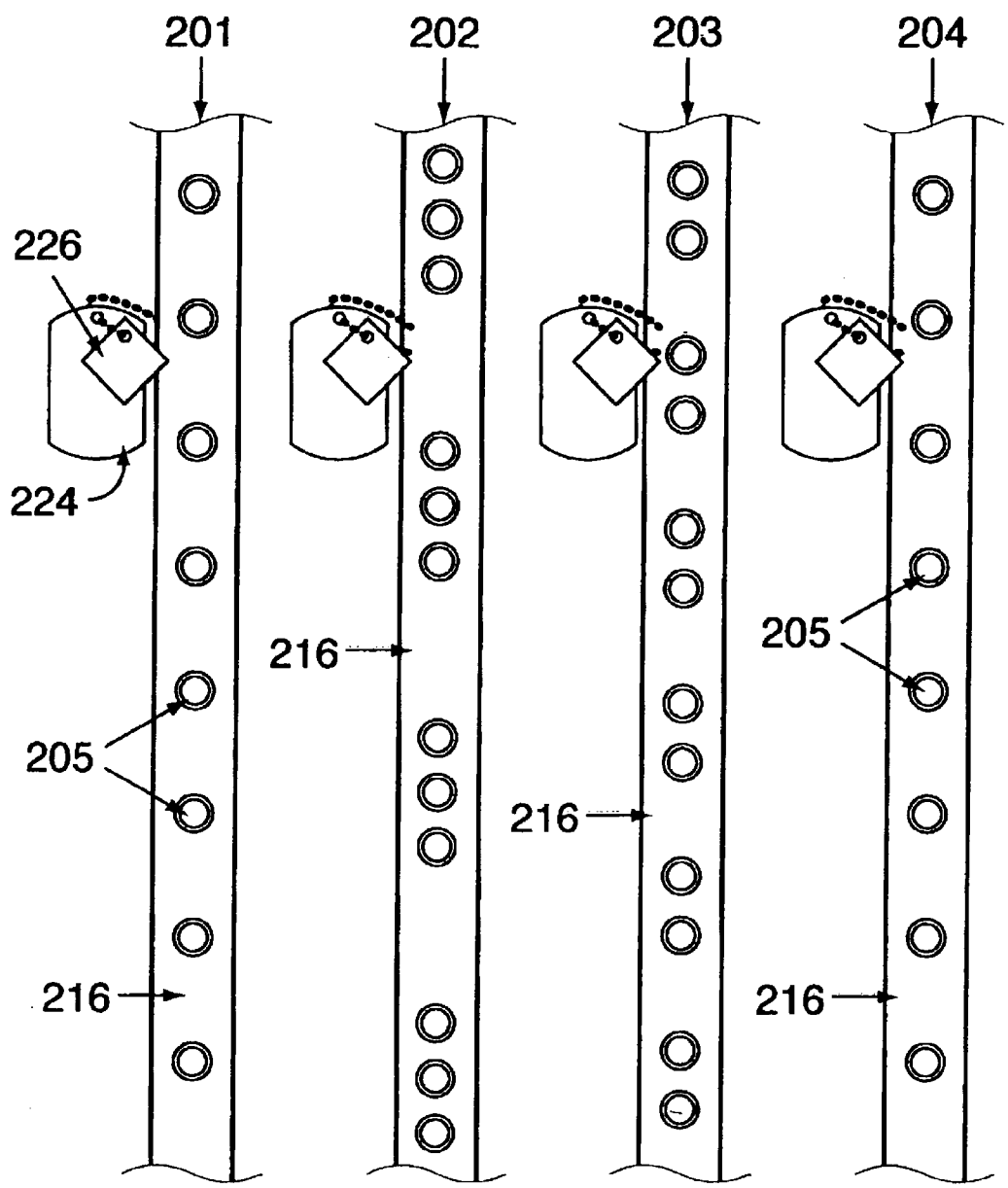
FIG. 10 depicts four styles of collars/leashes (also, e.g., harnesses or restraining devices) having highly reflective material formed in a shape and heat-seal stamped onto the collar/leash material in accordance with the present invention.

Referring to FIG. 10, reflective restraining devices 201–204 are shown. Devices 201–204 may be employed as collars, leashes, or other restraints to be used on animals or humans. Devices 201–204 may include, e.g., nylon, cotton, leather and/or a polyester material decorated with multi-colored highly reflective materials. The highly reflective material may be patterned into dots 205 or other shapes.

It is to be understood that the restraining devices as described herein as collars or leashes also include harnesses, straps, (e.g., bra straps), belts or other materials which may be worn on a human or pet. In addition, the collars, leashes, restraining devices, etc. as described herein also include attachments or extenders for conventional restraining devices, i.e., belt extenders, strap extensions or accessories that attaché to belts, collars, leashes, etc.

Figure 11A:
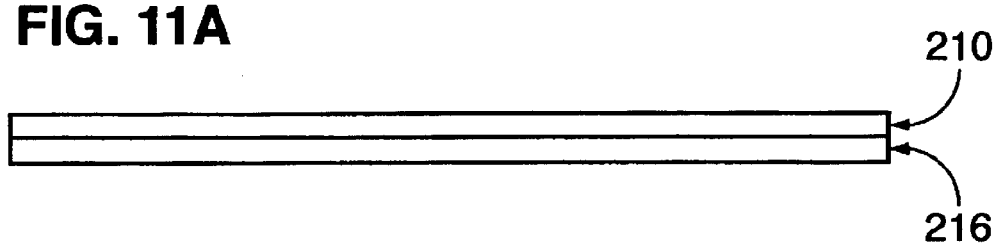
FIGS. 11A–C depict the formation of shapes, e.g., dots, to be stamped onto the collars/leashes as shown in FIG. 10 in accordance with the present invention.
Figure 11B:
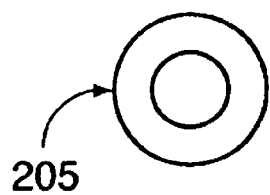
Figure 11C:
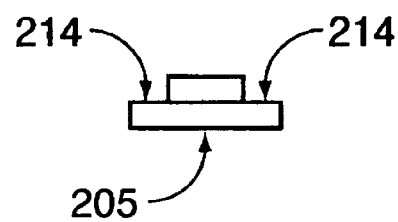

Referring to FIGS. 11A–C, reflective material 210 is preferably manufactured in sheets of tinted clear material then backed by a solid opaque white vinyl 212. Special and unique shapes and designs may then be silk screened for added detail and heat die-cut from these sheets to cause the edges to seal together (see top view of dot 205 in FIG. 11B). The heat cut may also be designed to not cut all the way through, thus creating recessed areas 214 within the created shape to form additional details of such shape (See e.g., FIG. 11C).

Referring to FIGS. 10, and 11A–C, die cut shapes or dots 205 are then applied to the nylon, cotton, leather or polyester materials 216 of leash by heat stamping and sealing in place. With the use of high temperature, the vinyl will melt and seal onto the desired material. The reflectivity of the material (e.g., reflective PVC) 210 can be seen up to 500 ft when hit with a beam of light from oncoming cars, etc. Leashes 201–204 may include a dog tag 224 and/or a dog tag reflector 226. Dog tag 224 and reflector 226 may include a metal (stainless steel, or copper with stainless steel plating) and have pressure stamped and etched wordings, such as, the name of a company, etc. or symbols, such a company logo. Reflector 226 may be silk-screened with graphics including but not limited to the company logo, etc. Reflector 226 maybe included in combination with any restraining device as described herein.

Figure 12:
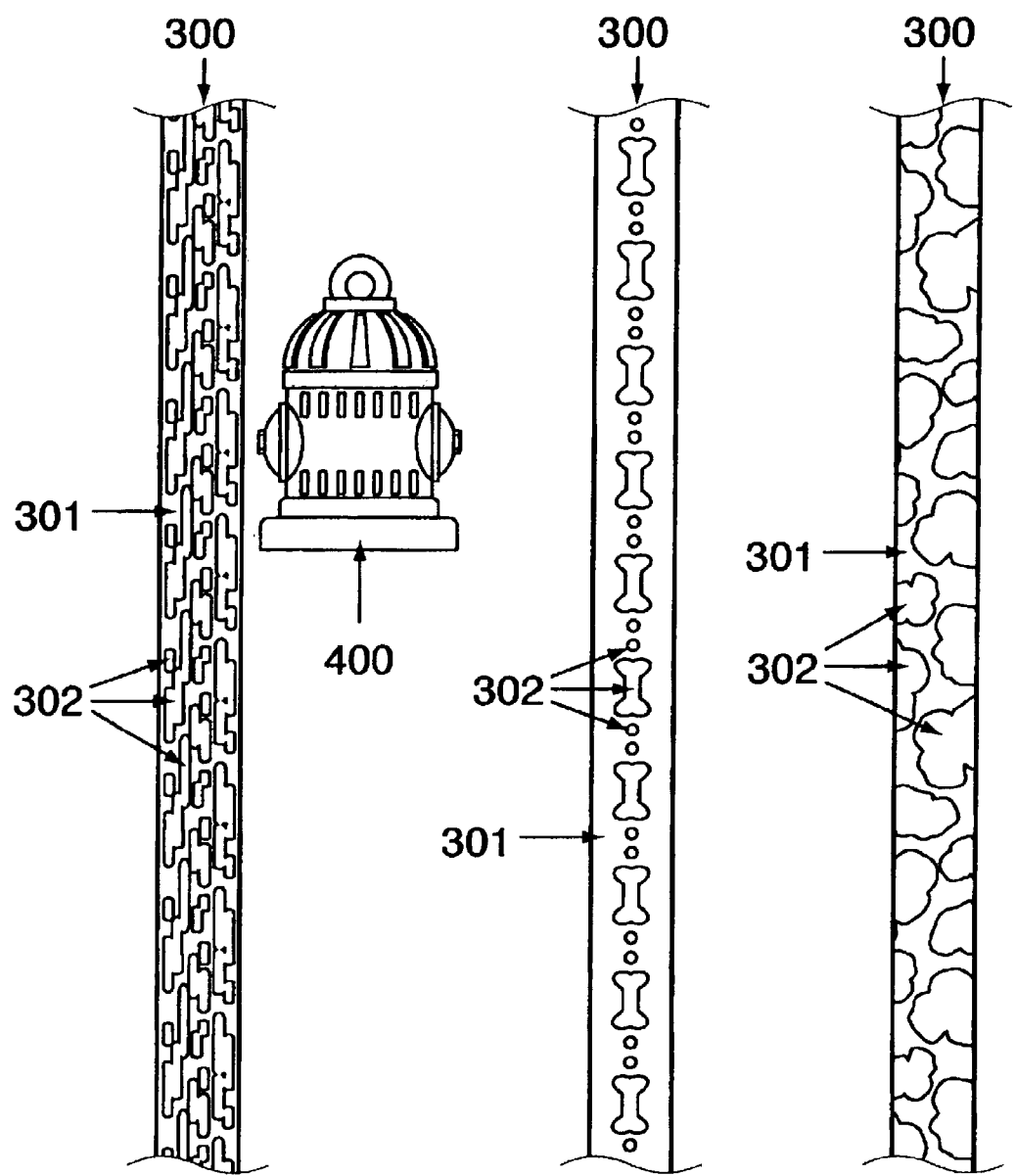
FIG. 12 depicts three styles of collars/leashes having highly reflective ink formed in a shape and showing a container device for transporting objects in accordance with the present invention.

Referring to FIG. 12, reflective restraining devices 300, such as collars, leashes to be used on animals, humans, etc. includes nylon and/or polyester material belts 301 decorated with reflective inks in accordance with the present invention. Ink 302 is stamped or silk-screened onto belt 301. Ink 302, which may include highly reflective ink available commercially from 3M™ or other suppliers, is applied to desired fabrics by a cylindrical roller and pressure stamping process. These inks include materials visible up to 700 ft when hit with a beam of light.

Figure 13:
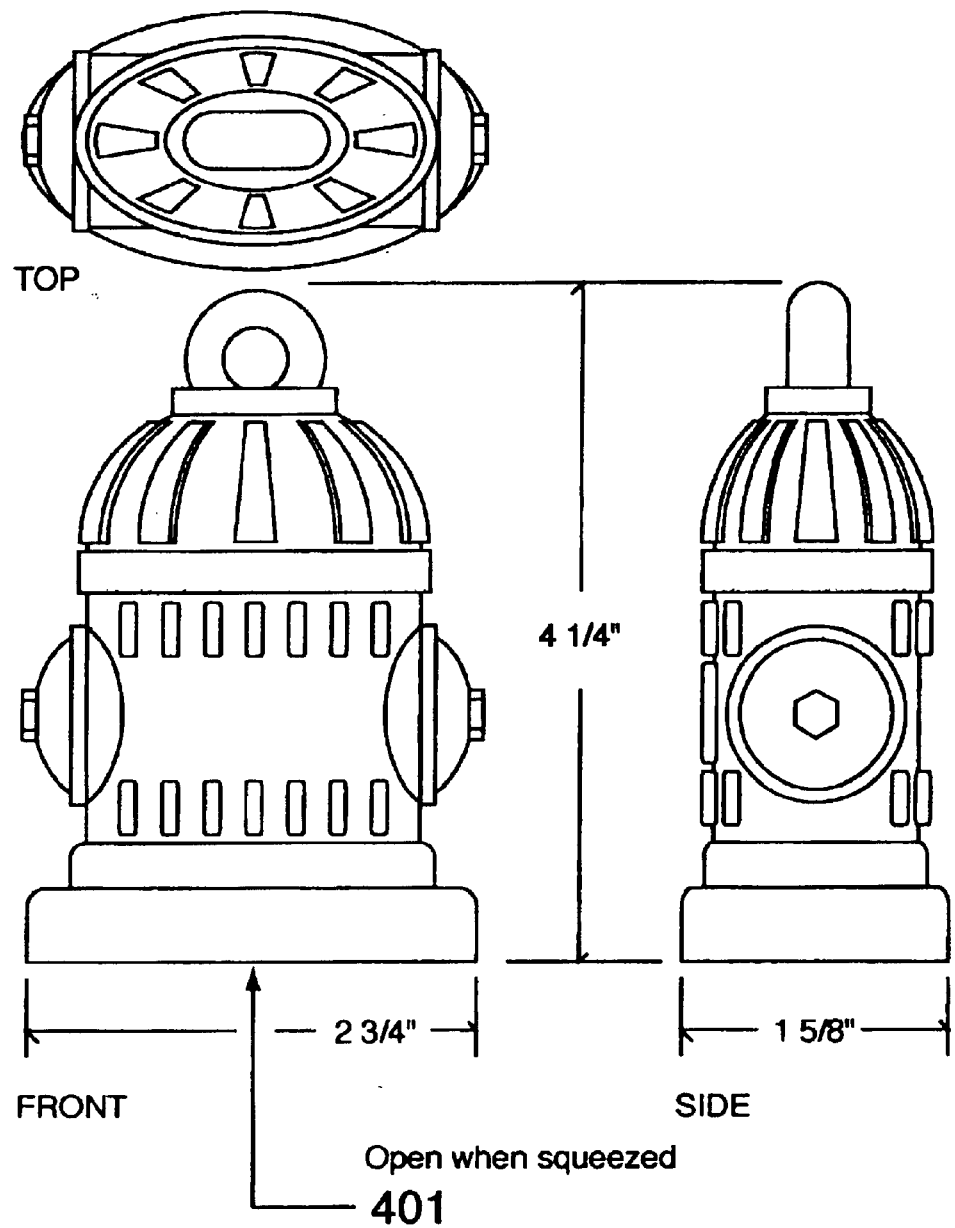
FIG. 13 shows the container device of FIG. 12 in accordance with the present invention.
Figure 19:
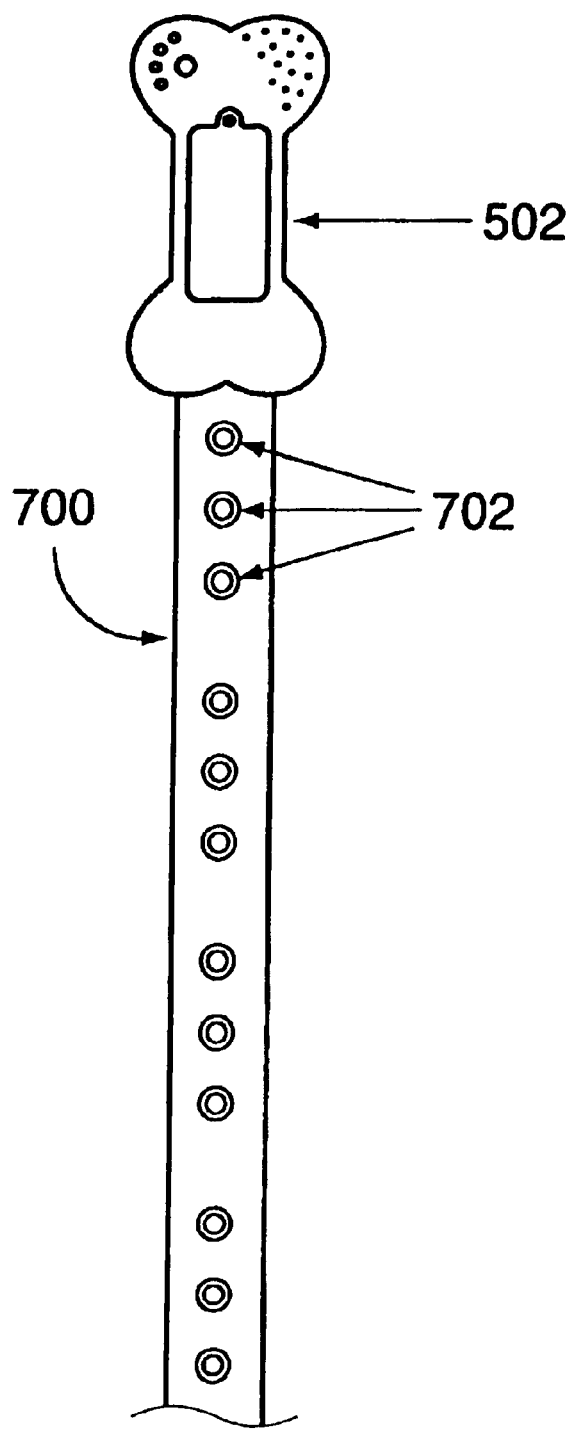
FIG. 19 depicts a collar/leash having light emitting diodes (LEDs) for transmitting light from within the collar/leash in different selectable sequences and durations and showing a control unit for powering the LEDs in accordance with the present invention.

Referring to FIGS. 12 and 13, a closure unit 400 preferably includes a soft durometer (40–60) rotational molded unit that has a clean cut or slit 402 across about ⅓ of the bottom or back. When the unit is squeezed, the pressure opens the cut allowing the consumer to store change, coins or other small essentials inside unit. The leashes of the present invention may include unit 400 attached to the leash to provide a storage area. The illustrative embodiment of FIGS. 19 and 20 show a fire hydrant, but any shaped closure may be employed.

Figure 14:
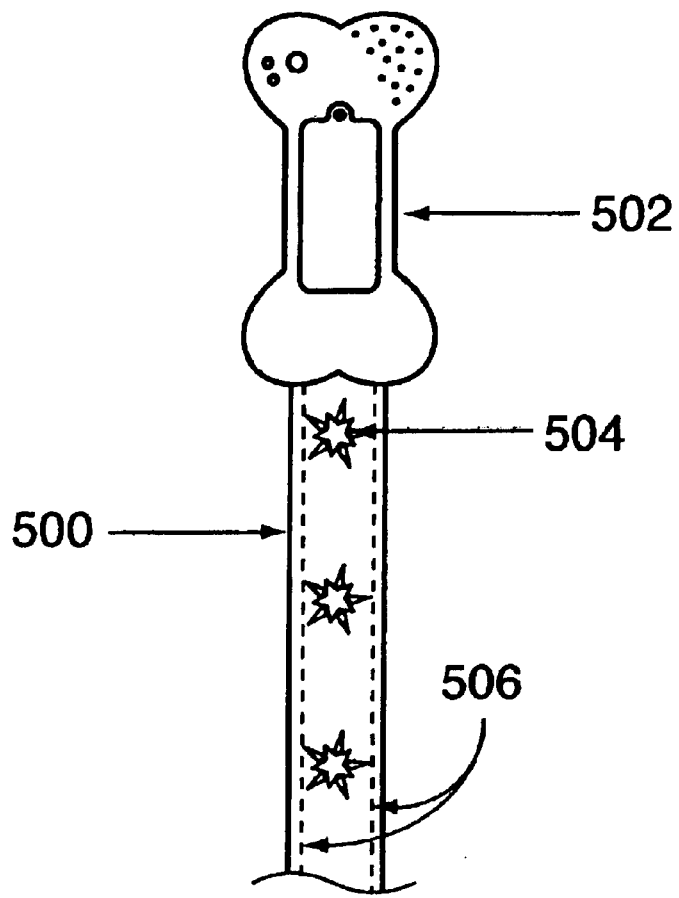
FIG. 14 depicts a collar/leash having optical fibers for transmitting light integrated therein and showing a control unit for powering the fiber optic lights in accordance with the present invention.
Figure 14:
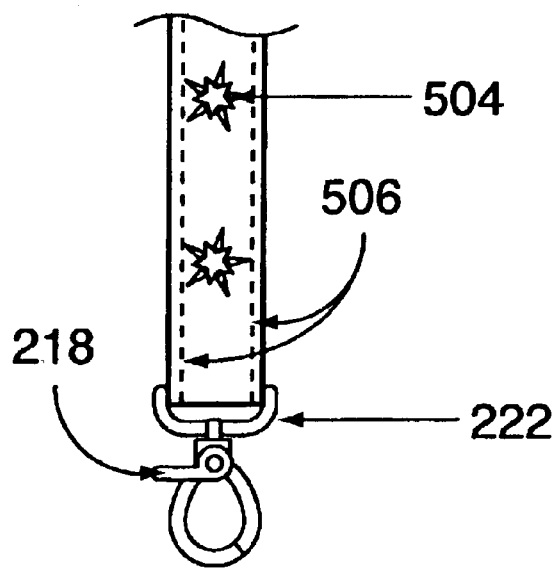

Referring to FIG. 14, light-up restraining devices 500 or accessories such as collars or leashes to be used on animals or humans are shown. Although FIG. 14 shows leash 500 only with simple reflective embroidered stars, it should be noted that outer surface of leash/collar may be decorated with numerous materials to create graphics for added aesthetics and reflectivity (including but not limited to silk screen glow-in-the-dark material, reflective PVC, embroidered with reflective threads etc.).

A power source/control unit 502 is provided to activate light emitting diodes 504 in leash/collar 500. In one embodiment, 0.5 mm thick fiber optic strands are passed through material of leash to create patterns, graphics or words. Fibers 506 permit each star 508 to light up. The fiber is then stitched into place on the back of the material of leash 500. The leash material may include nylon, polyester etc., an additional sheet of leash material is placed over the exposed fibers, and the edges are permanently stitched closed. Control unit 502 is preferably made of injection molded ABS or other durable housing material and is permanently secured to the leash/collar etc.

A metal clasp 218 and a buckle (not shown), "d" ring (dog snap) 222, and grommeted buckle holes (not shown) are provided. As is known in the art, these features are provided on all leashes/collars.

Figure 15:
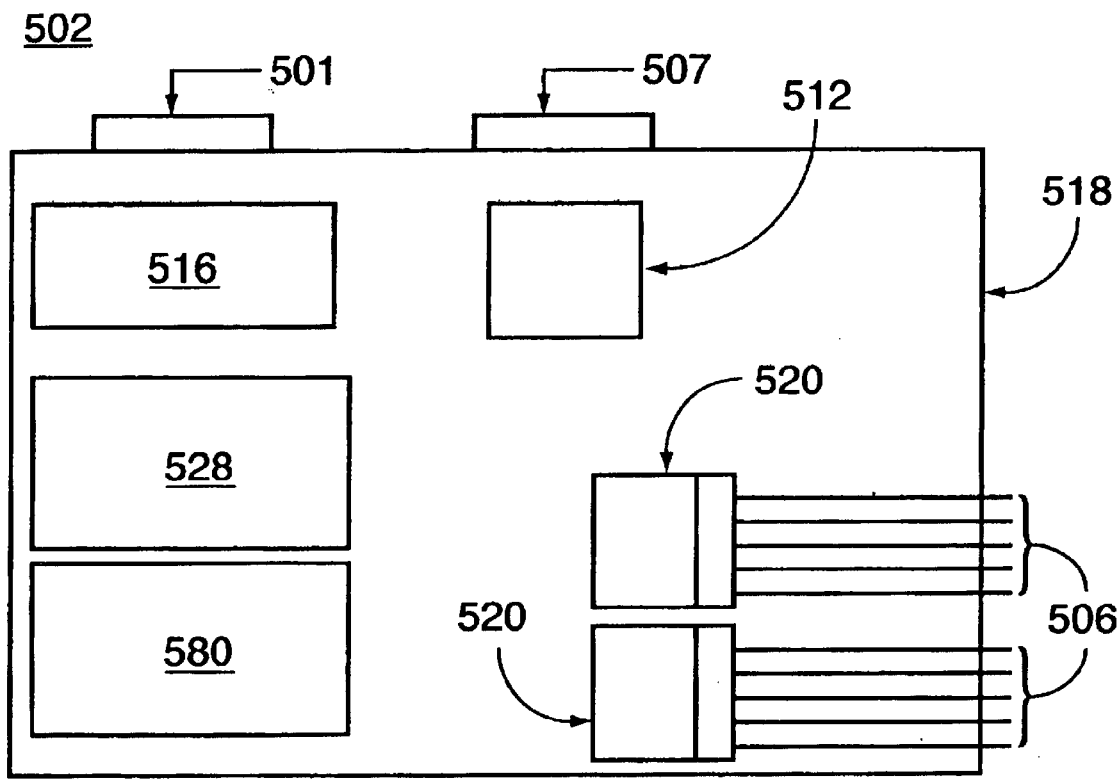
FIG. 15 is a schematic diagram of a printed wiring board of the control unit of FIG. 14 in accordance with the present invention.

Referring to FIG. 15, a schematic diagram is shown for a control unit 502 in accordance with the present invention. A programmed chip 512 permits the consumer to control fiber lights to blink on/off at different time intervals or sequences, e.g., 0.5 sec intervals lighting the fiber optic throughout the length of the collar/leash or other designed unit. An on/off switch 501 is also provided to power control unit 502 and its functions by turning a power source 516 on or off.

The bundle of fibers are then inserted into control unit 502, which houses batteries 516, a printed circuit board (PCB) 518, integrated circuit 512 for driving the LEDs, and super bright LEDs 520 for illuminating the bundle of fibers 506.

Control unit 502 may also include a flashlight 528. Flashlight 528 remains attached to collar/leash and provides visibility, for example, from up to 750 feet away. Control unit 502 may include multiple LEDs for different bundles of fibers (see also, e.g., FIG. 16). Chip 512 permits the consumer to turn on the flashlight 528 alone or simultaneously with the other LED's, which can blink on/off, for example, in intervals, lighting the fiber optic through the length of the collar/leash or other designed unit. This and other functions may be provided by employing a switch 507

In an alternate embodiment, control unit 502 may include an AM/FM radio 580 or other electronic device. Radio 580 may be included instead of or in addition to blinking lights, flashlight and/or LEDS. Radio or device 580 may be included on any leash of the present disclosure or as an accessory to conventional leashes and collars. Radio 580 and light/LEDs may be selected individually or used together.

Figure 16:
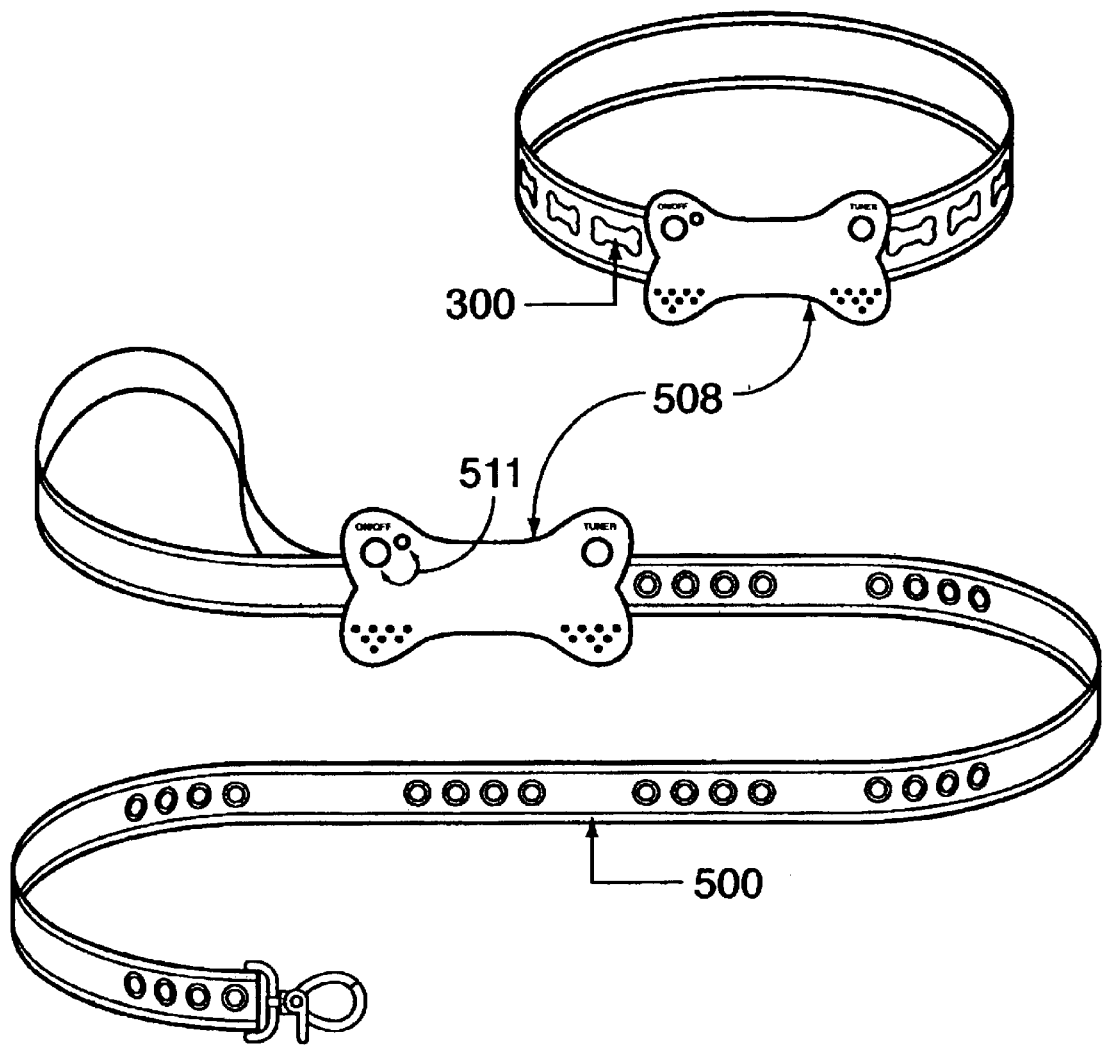
FIG. 16 is a perspective view of a collar and a leash having a control unit/radio (or other device) attached thereto in accordance with the present invention.
Figure 17:
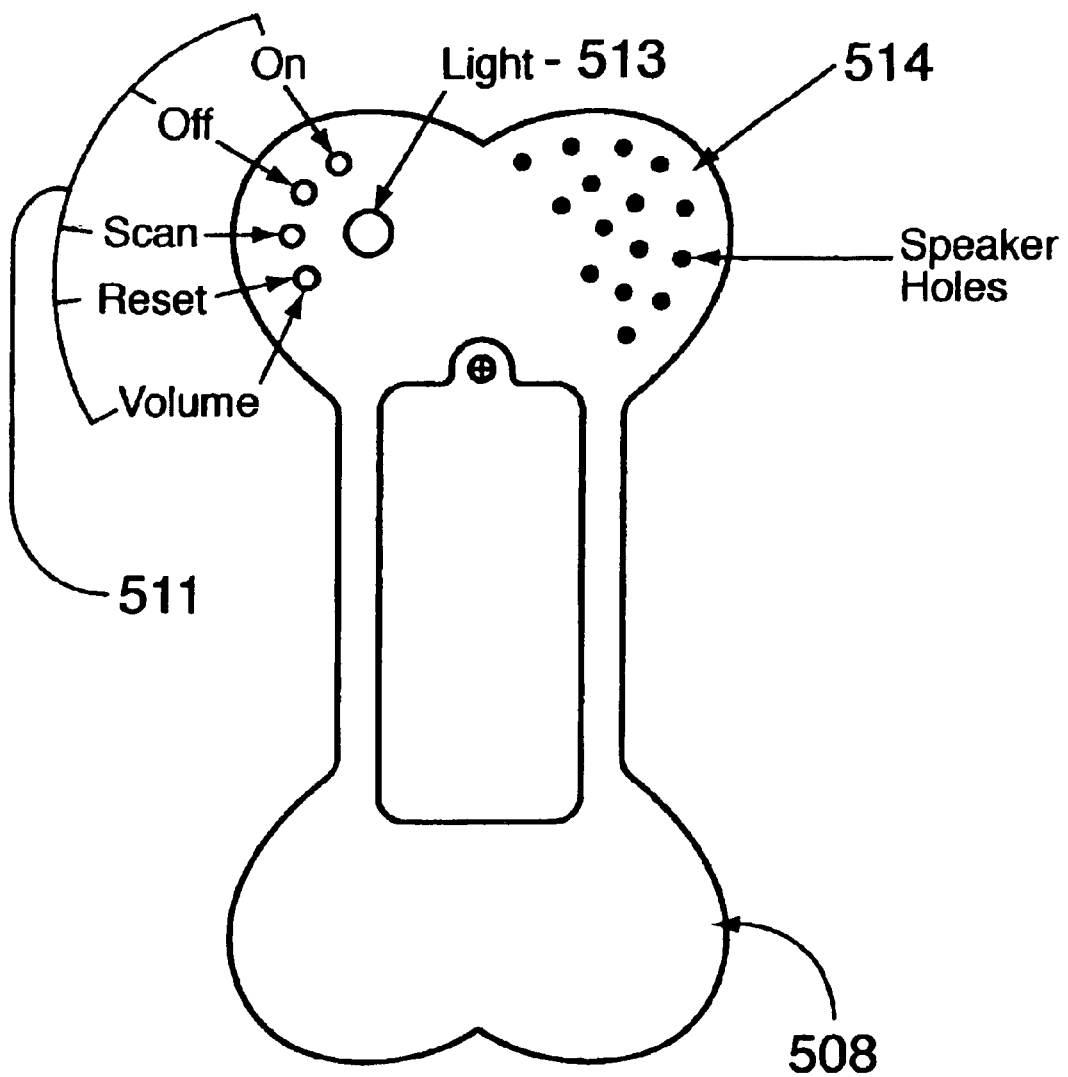
FIG. 17 shows another view of the control unit/radio (or other device) in accordance with the present invention.

Referring to FIGS. 16 and 17, radio 508 is shown on a leash 500. Radio 508 may include a bone shaped housing, although any other suitable shapes are also contemplated. Radio 508 includes controls 511, which may include a tuner/scanner, volume control and off and on switches. Radio 508 includes an "on" light 513 and a speaker 514. The controls 511 preferably include a low profile to prevent unintended activation of controls.

Additional entertainment and/or health features may be applied to any or all of the leashes/collars described herein. For added value and interactivity between pet and owner, the following devices may be incorporated into control unit 502, including but not limited to AM/FM radio, digital FM, MP3 player, pedometer, cell phone, personal digital assistant (PDA), calorie meter, etc.

Figure 18:
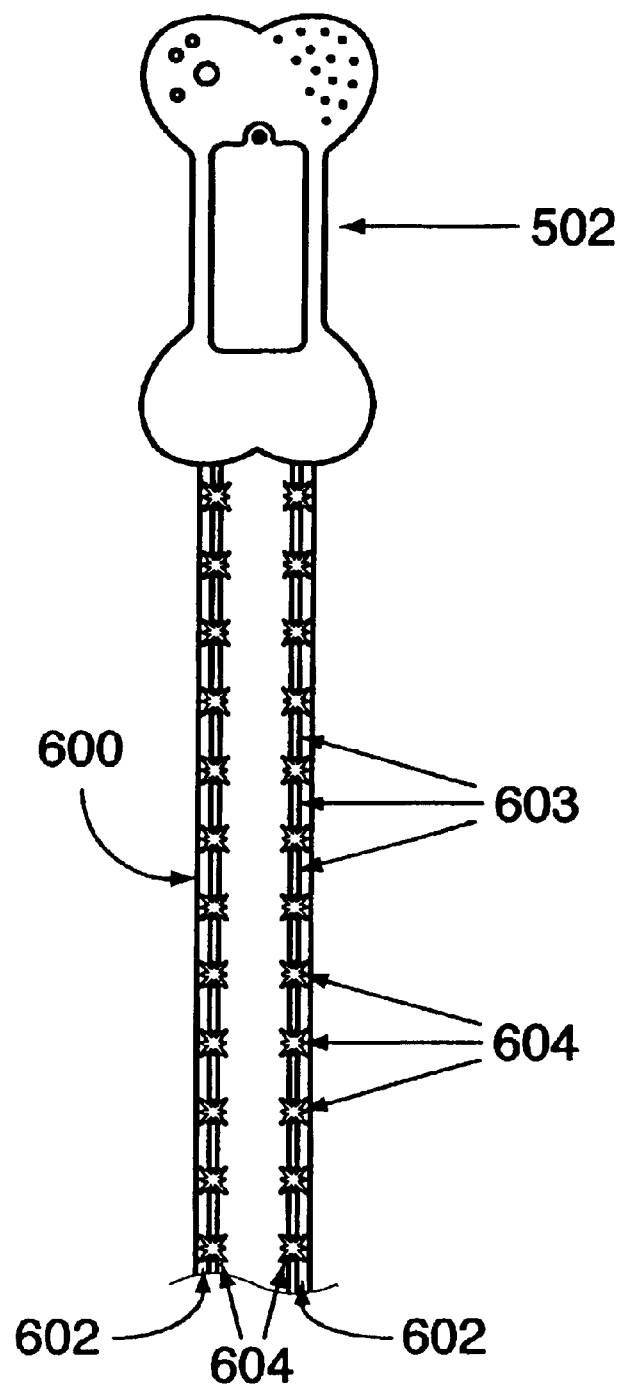
FIG. 18 depicts a collar/leash having optical fibers for transmitting light along side of the collar/leash and showing a control unit for powering the fiber optic lights in accordance with the present invention.

Referring to FIG. 18, an alternate embodiment of restraining device (e.g., leash, collar, strap, harness belt, etc.) 500 is shown. It should be noted that the outer surface of leash/collar 600 may be decorated with graphics for added aesthetics and reflectivity, e.g., silk screen glow in dark material, embroidered with reflective threads, etc.

Leash 600 includes a control unit 502, which provides light to one or more clear extruded tubes 602 of PVC or equivalent materials, which are attached to edges of the collar/leash 600. Multi-strands of optical fibers 604 are inserted into tubes 602.

In one embodiment, different styles of fiber optics maybe used and cut in lengths increasing by approximately, e.g., 2" so that when placed inside tubes 602, many lights will appear down the length of each tube 602. In one embodiment, a notched style fiber may be employed. Notched style fiber may be, for example, approximately 1 mm in diameter. The notched fiber includes notches 603 on an angle down the length of the fiber. This permits the light in the fiber to refract from the numerous angled cuts as well as from the tip of the fiber.

Referring to FIG. 19, another embodiment of the present invention includes a blinking lights leash/collar 700. One or more bright LED's 702 are placed throughout leash/collar 700 and controlled through a control unit 502. LED's are exposed throughout the material of leash/collar and may be surrounded by a metal finishing grommet. Chip 512 in control unit 502 (FIG. 22) allows a user to control the blinking sequence of the LEDs e.g., fast blink on/off 0.5 sec, slow blink on/off 1 sec, chasing sequence, etc. LEDs 702 are visible up to mile. Control unit 512 for the embodiment of the present invention, which employs LEDs, powers LEDs 702 by including conductive wires to power LEDS 702 instead of optical fibers 506. LEDs 702 are lit in the same way as LEDs 520.

Having described preferred embodiments for pet or human accessories (which are intended to be illustrative and not limiting), it is noted that modifications and variations can be made by persons skilled in the art in light of the above teachings. It is therefore to be understood that changes maybe made in the particular embodiments of the invention disclosed which are within the scope and spirit of the invention as outlined by the appended claims. Having thus described the invention with the details and particularity required by the patent laws, what is claimed and desired protected by Letters Patent is set forth in the appended claims.

What is claimed is:

1. A device for indicating a change in the presence of an electrical path in a pet dish, comprising:
   a first contact disposed on a probe;
   a second contact disposed in a spaced apart arrangement relative to the first contact; and
   an activation device responsive to the presence of an electrical path or lack thereof between the first and second contacts, the activation device being activated by and thus providing an indication of the change in the state of the electrical path between the first and second contacts.

2. The device as recited in claim 1, wherein the probe extends into the dish to sense a desired level of liquid in the dish.

3. The device of claim 2, wherein the electrical path is closed when the probe senses the desired level of liquid in the dish.

4. The device of claim 2, wherein the electrical path is opened when the liquid in the dish falls below the desired level.

5. The device of claim 2, wherein the activation device is activated when the liquid in the dish falls below the desired level.

6. The device as recited in claim 1, wherein the indication of the change in state is performed by at least one of an audio message, a visual effect and a mechanical motion.

7. The device as recited in claim 1, wherein the electrical path is closed by one of a tongue and saliva of a pet.

8. The device as recited in claim 1, wherein the first and second contacts are included on the probe.

9. The device of claim 1, wherein the device is integrally formed with the dish.

10. A liquid level indicator for a pet dish, comprising:
    a probe extending to a first depth in the pet dish;
    a first contact disposed on the probe, wherein the first contact is located at the first depth such that when the pet dish is filled with a liquid to at least the first depth, an electrical connection is made between the first contact and a second contact until a level of the liquid falls below the first depth; and
    an activation device coupled to the contacts, which provides an action to indicate when the level of liquid has fallen below the first depth.

11. The indicator as recited in claim 10, wherein the activation device includes a speaker which outputs audible warnings that the liquid in the pet dish is below the first depth.

12. The indicator as recited in claim 10, wherein the activation device includes a circuit, which selects a prerecorded message to play when the liquid falls below the first depth.

13. The indicator as recited in claim 12, wherein the circuit includes a chip having a plurality of messages recorded therein which are randomly selected to be played.

14. The indicator as recited in claim 10, wherein the probe is integrally formed with the pet dish.

15. The indicator as recited in claim 10, wherein the activation device includes at least one of a light and a mechanical motion device.

16. The indicator of claim 10, wherein the electrical connection is made between the first and second contact by one of a tongue and saliva of a pet.

17. A device for indicating when a liquid falls below a desired level in a pet dish comprising:
    a probe extending to a first depth in the pet dish;
    a first contact disposed on an end of the probe, wherein the first contact is located along the probe at the first depth such that when the pet dish is filled with a liquid to a level at least reaching the first depth, an electrical connection is made between the first contact and a second contact, the electrical connection being discontinued when the level of liquid falls below the first depth; and
    an activation device coupled to the first and second contacts for providing an action to indicate when the level of liquid falls below the first depth.

18. The device of claim 17, wherein the device is integrally formed with the dish.

19. The device of claim 17, wherein the electrical connection is closed by one of a tongue and saliva of a pet.

20. The device of claim 17, wherein the probe is adjustable to adjust the amount of the first depth.

* * * * *